US009161196B2

(12) United States Patent
Ballantyne et al.

(10) Patent No.: US 9,161,196 B2
(45) Date of Patent: Oct. 13, 2015

(54) APPARATUS AND METHOD FOR SECURE PRIVATE LOCATION INFORMATION TRANSFER

(75) Inventors: Wayne W. Ballantyne, Coconut Creek, FL (US); William P. Alberth, Jr., Prairie Grove, IL (US); Jeffrey S. Markwell, Winder, GA (US); Alexander Medvinsky, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 37 days.

(21) Appl. No.: 13/568,876

(22) Filed: Aug. 7, 2012

(65) Prior Publication Data

US 2014/0045450 A1    Feb. 13, 2014

(51) Int. Cl.
*H04M 11/04* (2006.01)
*H04W 4/22* (2009.01)
*H04W 4/02* (2009.01)
*H04M 3/42* (2006.01)
*H04M 3/51* (2006.01)
(Continued)

(52) U.S. Cl.
CPC ............... *H04W 4/22* (2013.01); *H04L 63/126* (2013.01); *H04M 3/42357* (2013.01); *H04M 3/5116* (2013.01); *H04W 4/02* (2013.01); *H04L 63/0823* (2013.01); *H04M 2242/04* (2013.01); *H04W 88/02* (2013.01)

(58) Field of Classification Search
CPC ............................ H04W 76/007; H04W 12/02
USPC ...................... 455/404.1, 404.2, 456.1, 456.2
See application file for complete search history.

(56) References Cited

U.S. PATENT DOCUMENTS 7,751,826 B2    7/2010  Gardner et al.
8,116,785 B2    2/2012  Choi et al.
(Continued)

FOREIGN PATENT DOCUMENTS

EP    1631039 A1    3/2006
WO    9852379 A1    11/1998

OTHER PUBLICATIONS

NENA, Interim VoIP Architecture for Enhanced 9-1-1 Services (i2), NENA 08-001, Issue 1 (Dec. 6, 2005).
(Continued)

*Primary Examiner* — Barry Taylor
(74) *Attorney, Agent, or Firm* — Morris & Kamlay LLP (57) ABSTRACT

An apparatus includes an emergency services location module, operatively coupled to location hardware. The emergency services location module is operative to receive a session certificate from an emergency services network entity in response to the apparatus placing an emergency services call or sending an emergency services message. The emergency services location module validates the session certificate to validate that the emergency services network entity is authorized to receive location information, and sends location information obtained from the location hardware to the emergency services network entity, in response to validating the session certificate. The emergency services location module may also be operative to override a user privacy setting that prevents location information from being sent from the apparatus, in response to determining that the session certificate is valid. The emergency services location module may also encrypt the location information prior to sending the location information to the emergency services network entity.

20 Claims, 8 Drawing Sheets

(51) Int. Cl.
   *H04L 29/06* (2006.01)
   *H04W 88/02* (2009.01)

(56) References Cited

U.S. PATENT DOCUMENTS

| | | | | |
|---|---|---|---|---|
| 2004/0242238 | A1* | 12/2004 | Wang et al. | 455/456.1 |
| 2006/0046744 | A1* | 3/2006 | Dublish et al. | 455/456.3 |
| 2007/0287428 | A1* | 12/2007 | Diacakis et al. | 455/414.1 |
| 2010/0248771 | A1* | 9/2010 | Brewer et al. | 455/518 |
| 2012/0284511 | A1* | 11/2012 | Paddon et al. | 713/168 |

OTHER PUBLICATIONS

NENA, NENA Functional and Interface Standards for Next Generation 9-1-1 Version 1.0 (i3), NENA 08-002 v1 (Dec. 18, 2007).
NENA, Detailed Functional and Interface Specification for the NENA i3 Solution—Stage 3, NENA 08-003 v1 (Jun. 14, 2011).
Communications Security, Reliability and Interoperability Council (CSRIC), Technical Options for E9-1-1 Location Accuracy, Working Group 4C (Mar. 14, 2011).
C. Neuman, T. Yu, S. Hartman, K. Raeburn, IETF Network Working Group, RFC 4120, The Kerberos Network Authentication Service (V5) (Jul. 2005).
J. Peterson, IETF Network Working Group, RFC 4119, A Presence-based GEOPRIV Location Object Format (Dec. 2005).
M. Thomson, J. Winterbottom, IETF Network Working Group, RFC 5139, Revised Civic Location Format for Presence Information Data Format Location Object (PIDF-LO) (Feb. 2008).
J. Winterbottom, M. Thomson, H. Tschofenig, IETF Network Working Group, RFC 5491, GEOPRIV Presence Information Data Format Location Object (PIDF-LO) Usage Clarification, Considerations, and Recommendations (Mar. 2009).
Patent Cooperation Treaty, "PCT Search Report and Written Opinion of the International Searching Authority" for International Application No. PCT/US2013/052477 dated Oct. 9, 2013, 11 pages.
"Functional and Interface Standards for Next Generation 9-1-1 Version 1.0 (i3)", 3GPP Draft; Func and ITF STD for NG9-1-1 13 Draft 20061215, 3RD Generation Partnership Project (3GPP), Mobile Competence Centre ; 650, Route Des Lucioles ; F-06921 Sophia-Antipolis Cedex; France, vol. SA WG1, no. Bangalore; 20070122, Jan. 22, 2007, XP050226124, 78 pages.

* cited by examiner (PRIOR ART)

APPARATUS AND METHOD FOR SECURE PRIVATE LOCATION INFORMATION TRANSFER

FIELD OF THE DISCLOSURE

The present disclosure relates generally to emergency calls and more particularly to next generation E911 emergency call systems, apparatuses and methods.

BACKGROUND

The National Emergency Number Association (NENA) provides various recommended standards for "Enhanced 911" ("E911") services such as the "Interim VoIP Architecture for Enhanced 9-1-1 Services (i2)," Issue 1, December 2005. The purpose of this and other standards is to prepare the telecommunications industry for the use of Voice over Internet Technology (VoIP) as the predominant telephony technology, and to provide an interim architecture such that callers in an Internet Protocol (IP) domain may connect and be supported by Public Safety Answering Points (PSAPs) within the existing E911 network.

Figure 1:
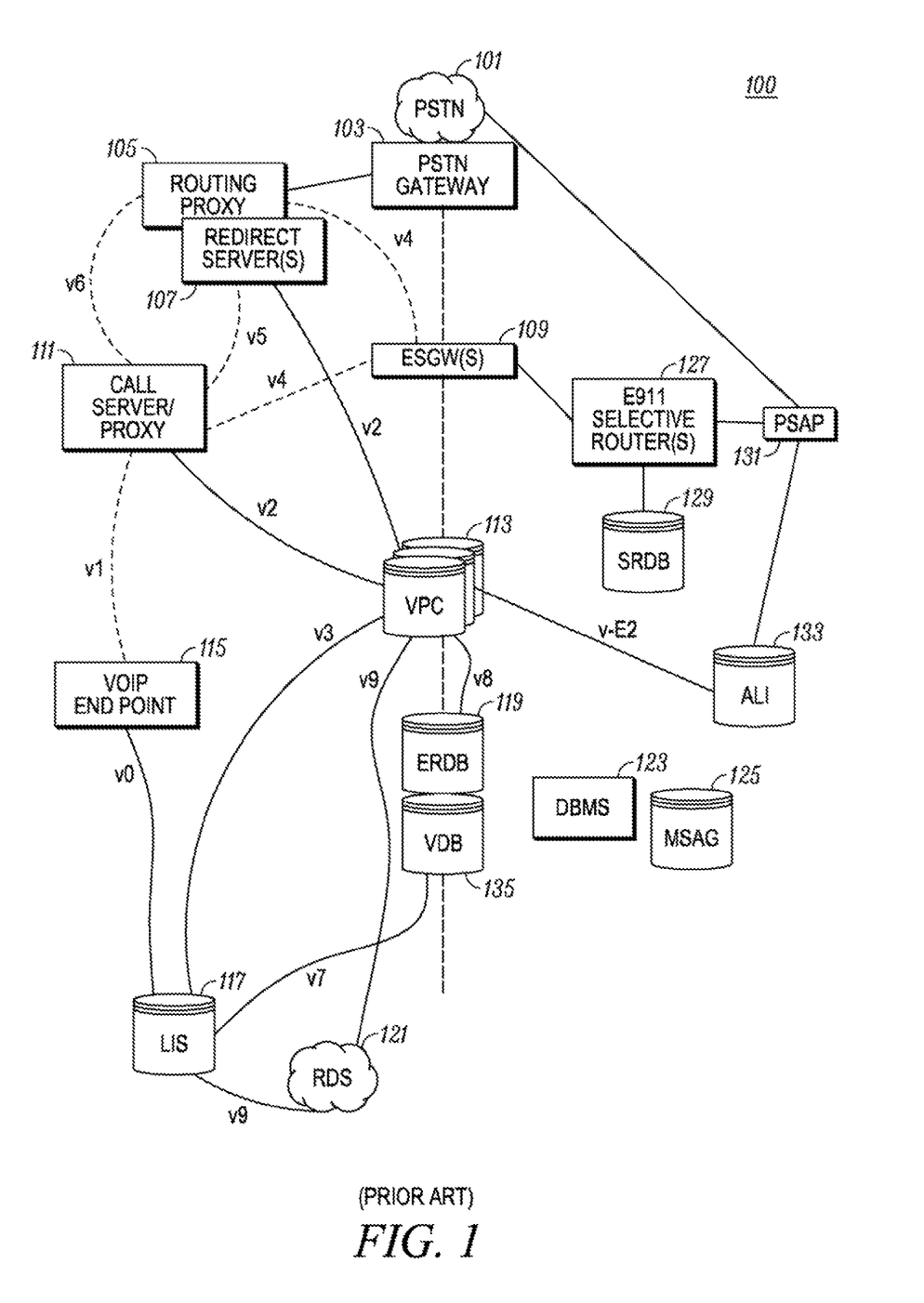
FIG. 1 is a block diagram of an emergency services network architecture for providing interfaces between the IP domain and existing Public Safety Answering Points (PSAPs), and interfaces for obtaining and exchanging location information for emergency response purposes.

An example emergency services network architecture 100 for providing interconnection between an IP domain and existing E911 infrastructure, as recommended by NENA in the publication "Interim VoIP Architecture for Enhanced 9-1-1 Services (i2)," 08-001, Issue 1 (Dec. 6, 2005), is illustrated in FIG. 1. The left side of the architecture represents the IP domain which includes various private and public server providers. Call control interfaces in the IP domain may be Session Initiation Protocol (SIP), H.323, or some other suitable protocol that can provide the required NENA and call control functionality. The various interfaces are defined by NENA. The various dashed line interfaces "v1," "v4," "v5," and "v6" represent logical signaling interfaces, such as SIP signaling interfaces. The solid line interfaces "v0," "v2," "v3," "v7," "v8," and "v9" represent logical interfaces for exchanging location related data in the IP domain.

The Public Switched Telephone Network (PSTN) 101 in the circuit switched domain interfaces directly with the PSAP 131 as shown. On the circuit switched side, an Automatic Location Identification (ALI) database 133 provides the PSAP with a caller's address or geodetic (XY) location of the telephone and also supplementary emergency service information related to the location of call origination. Non-emergency calls can be sent between the PSTN 101 and the IP domain via a PSTN gateway 103 which interfaces with one or more routing proxy 105 and corresponding redirect servers 107.

To provide emergency service access for the IP domain, E911 selective routers 127 operate in conjunction with a Selective Routing Database (SRDB) 129 which is the routing table relating telephone numbers to Emergency Service Numbers (ESNs) and which determines the routing of 911 calls. The E911 selective routers interface with one or more Emergency Services Gateways (ESGW) 109 which provide a signaling and media interface between the circuit switched conventional E911 SRDB 129 and the IP domain.

In the IP domain dashed line, logical signaling interfaces, the v4 interface is for forwarding calls via the routing proxy 105, or call server/proxy 111, to the correct ESGW 109. The v5 interface is defined as a SIP interface between the call server/proxy 111 and redirect server(s) 107; while the v6 interface is defined as a SIP interface between the call server/proxy 111 and the routing proxy 105. A VoIP end point 115, such as a VoIP telephone, communicates with the call server/proxy 111 via the v1 interface.

In the IP domain, the solid line logical interfaces "v0," "v2," "v3," "v7," "v8," and "v9" are related to location information. The VoIP end point 115 may receive pre-determined location information from a Location Information Server (LIS) 117 over the v0 interface. The LIS 117 may serve as a location information repository with either geo-spatial location data or civic address data, correlated to physical locations. The LIS 117 may also include a "wiremap," that is, mappings between individual location information and logical representations of the physical locations. The VoIP Positioning Center (VPC) 113 provides routing information for VoIP emergency calls and helps deliver location information to the PSAP 131 using the ALI 133 infrastructure using the v-E2 interface. The call server/proxy 111 uses the v2 interface to request emergency call routing information from the VPC 113 in architectures where the call server/proxy 111 and/or the routing proxy 105 and redirect server(s) 107 are separate elements from the VPC 113.

The v3 interface is defined as an optional interface that allows the VPC 113 to obtain an emergency caller's location from the LIS 117. The v7 interface is a location validation interface between the LIS 117 and the Validation Database (VDB) 135, that the LIS 117 uses to request validation of a specific civic location. The VDB 135 checks the civic location, received in the request, in the Standard Master Street Address Guide (MSAG) 125. A database management system (DBMS) 123 interacts with the MSAG 125, the VDB 135 and an Emergency Services Zone Routing Database (ERDB) 119. The VPC 113 may query the ERDB 119 using the v8 interface and obtain routing information and other information for an emergency caller. The v9 interface enables the LIS 117 or the VPC 113 to discover the appropriate VDB/ERDB via the Root Discovery Server 121.

Figure 2:
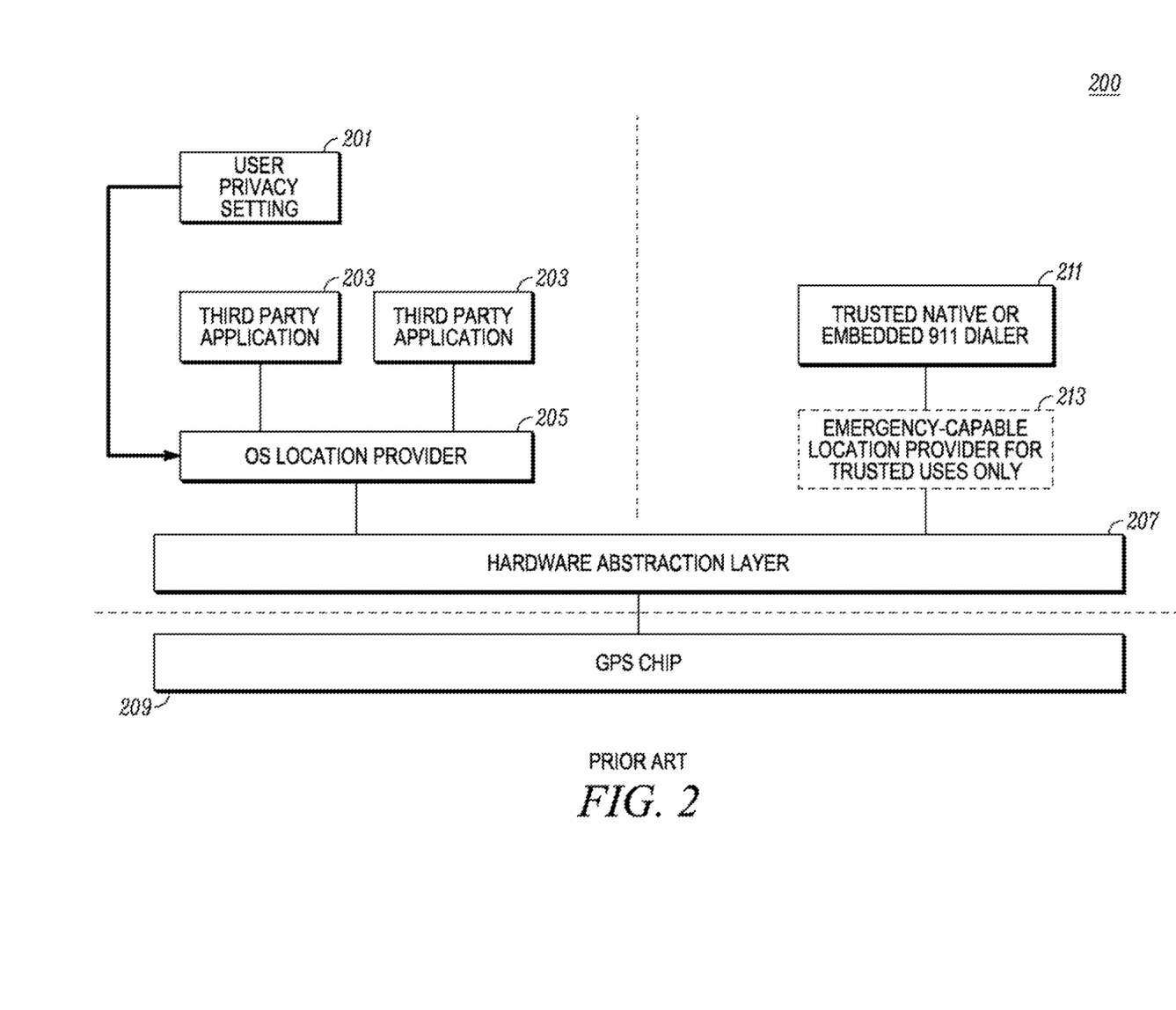
FIG. 2 is block diagram of existing software architectures in a mobile device, for obtaining location information from the mobile device GPS location system.

FIG. 2 illustrates an example of an existing software architecture 200 for obtaining location information from a mobile device GPS location system supporting both E911 Phase 2 calls requiring precise location, and Location-based services (LBS). The software architecture 200 illustrates a portion of a software stack that includes an application layer having various third party applications 203. An operating system location provider 205, provides location information to the third party applications 203 based on restrictions related to a user location privacy setting 201 which, in turn, pertains to LBS usage. The user privacy setting 201 may be, for example, stored in a memory location of the mobile device. The operating system location provider 205 may receive location information requests from any of the various third party applications 203. In response, the operating system location provider 205 will check the user privacy setting 201 and, in compliance with the setting, will obtain location information from, for example, GPS chip 209 via a hardware abstraction layer 207. If the user privacy setting is, for example, set to "GPS Disabled," then an LBS application needing the user's GPS location would receive an error message when attempting to obtain the location. The location information could also be obtained from location servers which may utilize measurements provided by GPS chip 209. For emergency call purposes, a trusted or embedded 911 dialer 211 is present that directly accesses the GPS chip 209, and thus location information, via the hardware abstraction layer 207, regardless of the user privacy setting. This trusted dialer is now used mostly for circuit switched 911 access using a traditional circuit switched wireless technology for voice calls such as GSM, UMTS, and CDMA 1X, however it could also be used for "managed" VoIP services specified by the wireless operator for voice calling on an LTE network, for example. Some configurations of the software architecture 200 may also include an emergency-capable location provider 213 which operates for trusted uses only (such as operating in conjunction with trusted native or embedded 911 dialer 211).

Various problems exist for implementing "Next Generation" 911 (NG911) systems within the constraints of the network and mobile device architectures illustrated in FIG. 1 and FIG. 2. Specifically, given that the latest model mobile devices provide interfaces for access by various third party software developers, any so-called "over-the-top" VoIP applications, capable of dialing 911, could come from any third-party whose trustworthiness cannot be guaranteed. Although the FCC rules currently do not require such over-the-top VoIP applications to comply with E911 Phase 2 requirements, it is contemplated that the FCC may change its policy and allow any downloadable VoIP application to be able to dial 911, obtain Phase 2 location, and then deliver it to a PSAP. On one hand, the enforcement of the user privacy setting for NG911-compatible applications means that the emergency application may be refused access to the GPS hardware by the OS location provider, thus precluding one of the primary uses of the emergency application. On the other hand, the bypassing of the user privacy setting for NG911-compatible applications places private personal location information at risk.

For example, a third party NG911-compatible application may be able to access readable latitude and longitude information even though the user has turned on their mobile device location privacy setting. A malicious or defective VoIP or messaging application may leak the user's latitude and longitude to unwanted parties, against the explicit wishes of the user.

DETAILED DESCRIPTION

The present disclosure provides an end-to-end security architecture to allow mobile device location data to be obtained for the purpose of emergency communication, regardless of the user's selection of location privacy settings, without placing private location information at risk. The disclosed embodiments address the challenges posed by the introduction of Next Generation 911 (NG911) that employs Voice-over-IP (VoIP) and SMS/MMS access to Emergency Services. More specifically, the disclosed embodiments provide a location information security mechanism for NG911 compatible, third party applications, which carry out emergency communications and which may be downloadable by a user after purchasing a mobile device. Examples of such applications include enhanced text messaging applications that allow texting to 911 or "SOS," or over-the-top VoIP applications that will allow a user to call 911.

Previously, third party, non-emergency applications would interact with the operating system's "Location Provider" to obtain location information. An example is shown in FIG. 2 where the various third party applications 203 obtain location information from the operating system location provider 205. In the software architecture 200 of FIG. 2, the Location Provider 205 would refuse to provide location information if the user had turned off GPS capability or restricted location sharing in the user privacy setting 201.

The disclosed embodiments enable location to be obtained for NG911 use regardless of the user's privacy setting. This is achieved via the usage of session certificates that are generated by an entity associated with the VPC or the Public Safety Network. That is, the mobile device receives a session certificate that authenticates that the request for Location Override originates from a Public Safety network entity. The session certificate has a short-term validity, roughly on the order of one to three times the average length of an E911 call, and includes the identity of the entity that is requesting location information. The session certificate is used to cryptographically bind the entity requesting location information to the VoIP call session. In addition to the short validity period, which is associated with an expected maximum duration of the call, a session certificate may also include a call identifier. The session certificate is signed by a known trusted entity that is trusted by mobile devices to issue such certificates. A legitimate network entity, such as, but not limited to, a VPC, would have therefore obtained this signature from one of the legitimate validating authorities.

A first aspect of the disclosure provides an apparatus including an emergency services location module, operatively coupled to location determining hardware. The location determining hardware may be Global Positioning System (GPS) hardware or another location system such as, but not limited to, GNSS, U-TDOA, RF signature, etc. The emergency services location module is operative to receive a session certificate from an emergency services network entity in response to the apparatus placing an emergency services call or sending an emergency services message. The emergency services location module validates the session certificate to validate that the emergency services network entity is authorized to receive location information, and sends location information obtained from the GPS hardware to the emergency services network entity, in response to validating the session certificate. The emergency services location module may also be operative to override a user privacy setting that prevents location information from being sent from the apparatus, in response to determining that the session certificate is valid. The emergency services location module may also encrypt the location information prior to sending the location information to the emergency services network entity.

A second aspect of the disclosure provides a method including receiving, by a mobile device, a session certificate from an emergency services network entity, validating the session certificate to validate that the emergency services network entity is authorized to receive location information; and sending location information to the emergency services network entity, in response to validating the session certificate.

The method may include overriding a user privacy setting of the mobile device that prevents location information from being sent, in response to determining that the session certificate is valid. The method may also include encrypting the location information prior to sending the location information to the emergency services network entity.

A third aspect of the disclosure provides a method of operating an emergency services network entity. The method includes sending a location information request message from the network entity to a mobile device, including a session certificate. The location information request is sent in response to an emergency services message from the mobile device. The method includes receiving location information from the mobile device in response to the location information request message.

The method may also include decrypting the location information, and sending the decrypted location information to a public safety answering point (PSAP).

A fourth aspect of the disclosure provides a method of operating an emergency services network. The method includes sending a first message from a VoIP Positioning Center (VPC) to a location information server (LIS) including a VPC session certificate, sending a second message from the LIS to a VoIP application of a mobile device over a wireless interface, receiving a third message by the LIS from the mobile device, the third message including location information, and receiving a fourth message by the VPC from the LIS including the location information. The method may also include decrypting the location information by the VPC, and
  sending the decrypted location information from the VPC to a public safety answering point (PSAP).

Figure 3:
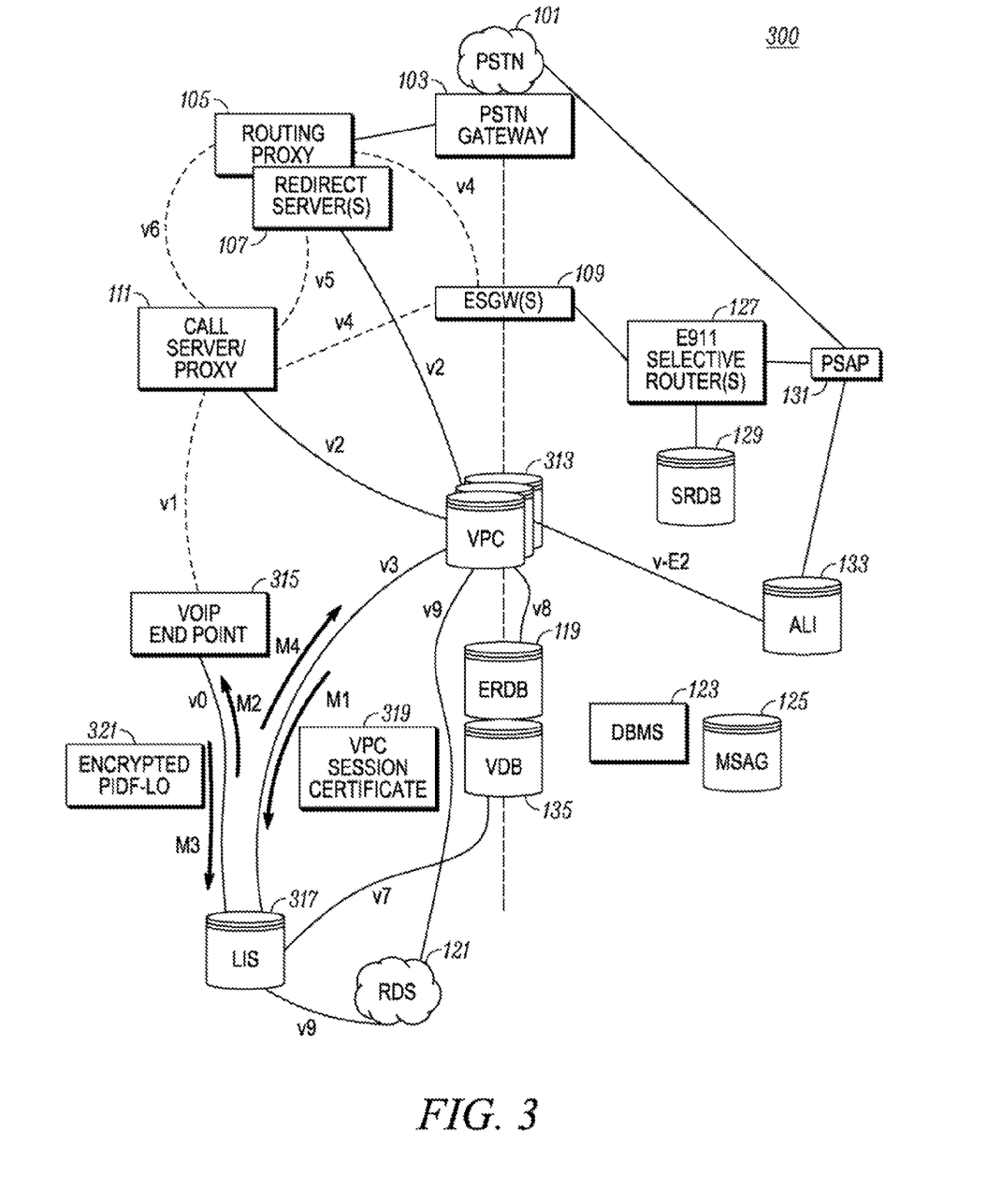
FIG. 3 is diagram of the emergency services network architecture of FIG. 1, modified to provide secured transfer of location information in accordance with the embodiments.

Turning now to the drawings wherein like numerals represent like components, FIG. 3 illustrates an emergency services network architecture 300 that has been modified in accordance with the embodiments. The emergency services network architecture 300 supports mobile devices using VoIP or SMS/MMS to initiate 911 emergency services and can transfer location information from the IP domain to a legacy PSAP 131 infrastructure. The location information may be, for example, Global Positioning System (GPS) coordinates, or some other location coordinates that provide a location of a mobile device. The location information of a mobile device may be requested by various emergency services network entities such as, a VPC 313, LIS 317, or some other emergency services network entity.

In FIG. 1 which was briefly discussed above, the VoIP end point 115 referred to a VoIP desk phone as the VoIP endpoint 115. In FIG. 3 the VoIP end point 315 is a mobile device such as, but not limited to, a 4G mobile device running an over-the-top VoIP client at an application layer of the mobile device software stack. For the embodiment illustrated by FIG. 3, the v0 interface, between the VoIP end point 315 and the Location Information Server (LIS) 317 represents a signal path for the VoIP end point 315 to transfer location information. The location information may be transferred in a format such as, for example, in a Presence Information Data Format Location Object ("PIDF-LO") 321 which is described in the Internet Engineering Task Force (IETF) Request For Comments 4119 (RFC4119). However, any suitable location information format may be used in accordance with the embodiments. The LIS 317 in turn transfers the location information PIDF-LO 321 to the VPC 313, which then transfers the location information to the Automatic Location Identification (ALI) database 133. The PSAP 131 can then query the ALI database 133 for a specific E911 call using session keys.

As briefly discussed above, for third party applications, an NG911-compatible application could come from any third-party whose trustworthiness cannot be guaranteed. Therefore, the various embodiments provide protection of the location information. That is, if a mobile device user has turned on a location privacy setting that blocks disclosure of location information, the embodiments do not allow third party applications to obtain readable latitude and longitude, since it cannot be guaranteed that the application will use it solely for an NG911 call or for a Non-Voice Emergency Services (NOVES) event, such as text messaging to 911. A malicious or defective VoIP or messaging application may leak the user's latitude and longitude to unwanted parties, against the explicit wishes of the user. Therefore the embodiments require that the location information is encrypted using a symmetric session key or an asymmetric public key which belongs to the VPC and is included in the VPC session certificate 319.

During either a VoIP 911 call or NOVES event, a request for location would come from the Emergency Services Network or other location-authorized entity. In FIG. 3, message M1 is sent by the VPC 313 to the LIS 317 and contains the VPC session certificate 319. The VPC session certificate 319, in accordance with the embodiments, can only be sent by a VPC 313 that is credentialed to be a valid originator of such a certificate by Public Safety or third parties authorized by Public Safety. In message M2, the VPC session certificate 319 is sent by the LIS 317 to a VoIP application in the VoIP end point 315 and may contain other network-specific information. The message M2 may be transmitted to the VoIP end point 315 over any suitable wireless interface such as, but not limited to, UMTS, WiFi, LTE, WiMAX, etc. Additionally, messages M1 and M2 may use a messaging protocol such as, but not limited to, Transport Layer Security (TLS), Tunneled TLS (TTLS), or any other suitable messaging protocol.

In accordance with the embodiments, a mobile device such as VoIP end point 315, must authenticate the location information requestor, to ensure that the location request was truly originated from the NG911 Emergency Network, a Voice Positioning Center (VPC), the U.S. Government, or other agency authorized for privacy override. Therefore, in accordance with the embodiments, as part of the IP data of the location request, the requestor includes a session certificate such as VPC session certificate 319. In accordance with the embodiments, the session certificate may be included as part of the messaging or may be adjacent to the messaging that requests location information.

In one example, the VPC session certificate 319 in messages M1 and M2 contains the VPC public key and is signed by a trusted authority's private key. Once the session certificate is received by the VoIP end point 315 as part of the location request, the VoIP application or messaging application of the VoIP end point 315 passes the session certificate down to the lower, native layers of the VoIP end point 315 software.

Figure 4:
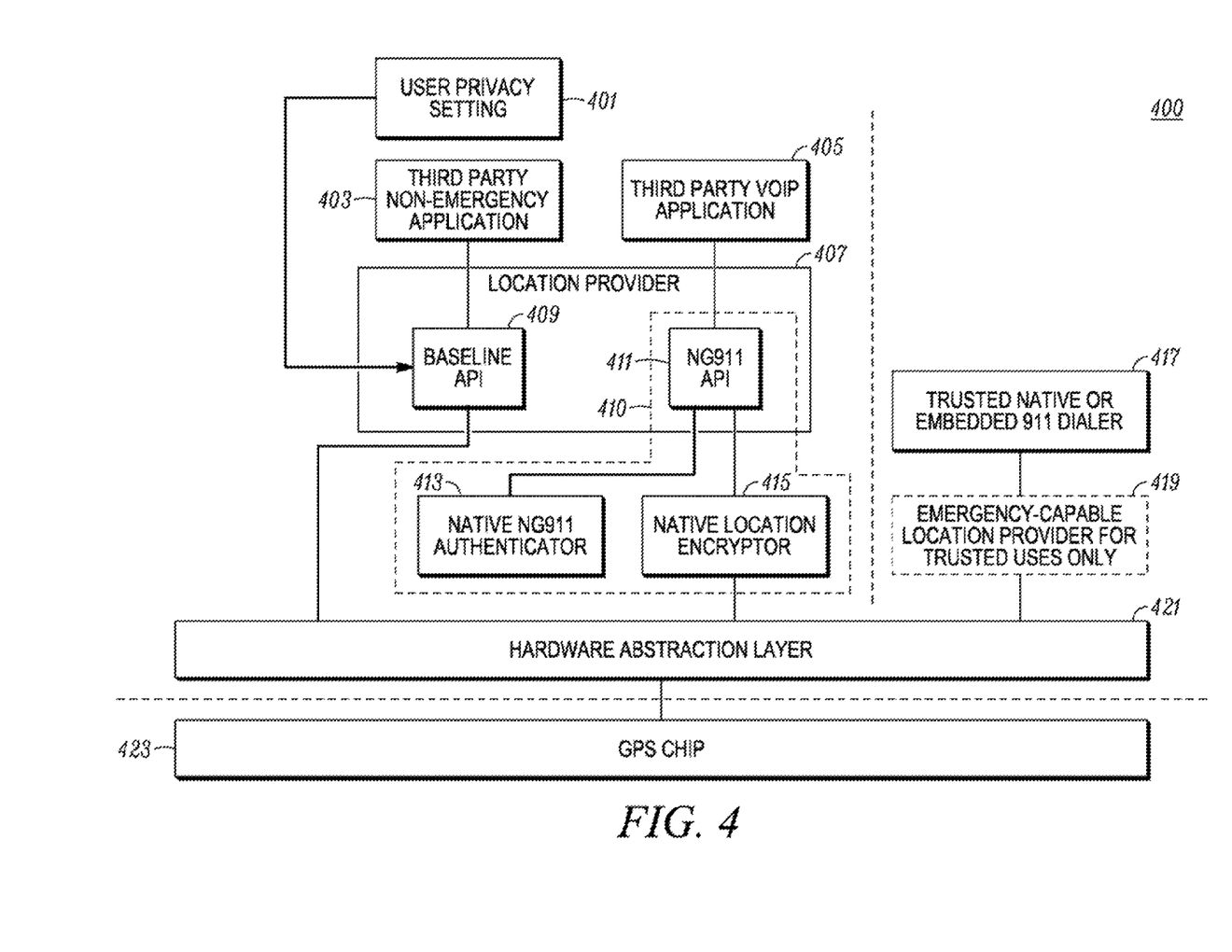
FIG. 4 is block diagram of a mobile device software architecture in accordance with the embodiments.
Figure 5:
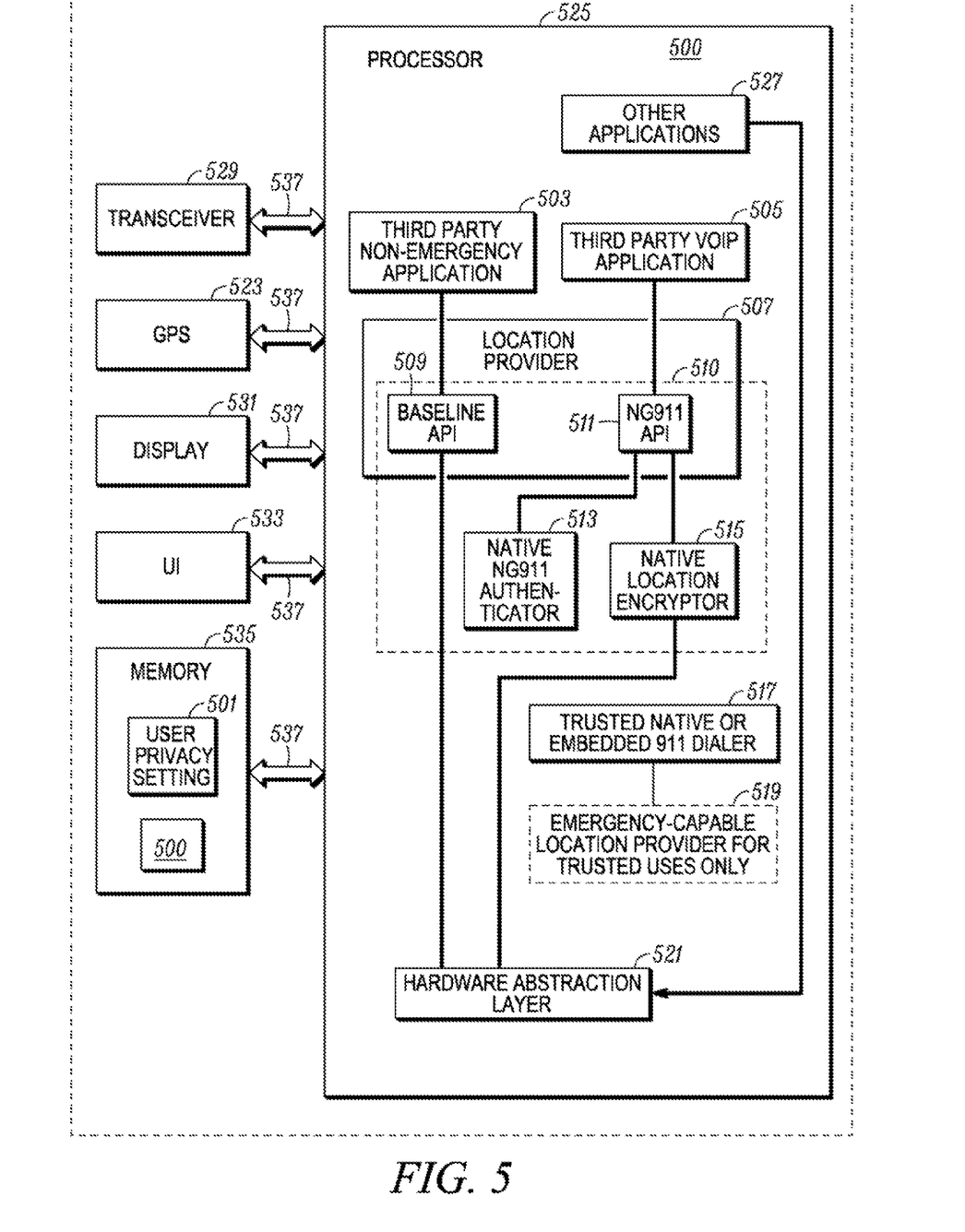
FIG. 5 is a block diagram of an example apparatus in accordance with various embodiments.

This is best understood with respect to FIG. 4 and FIG. 5. FIG. 4 illustrates a software architecture 400 having a software stack that includes an emergency services location module 410 in accordance with various embodiments. FIG. 5 illustrates an apparatus that includes an emergency services location module 510 in accordance with one embodiment. In FIG. 4, the request is passed down to the emergency services location module 410. The emergency services location module 410 includes an emergency services location API, NG911

API 411, which passes the request to a native NG911 authenticator 413. The native NG911 authenticator 413, may be written and controlled by the mobile device (i.e. the VoIP end point) manufacturer in one embodiment. The software may use pre-installed or downloaded public keys or certificates for the trusted authorities in order to validate a location information requestor's session certificate and authenticate the requestor. If the requestor is not an authorized VPC or other location-authorized entity, the session certificate process will fail, and the mobile device will deny the request for location information. The validation process includes checking the signature, the validity period and, optionally, a call identifier.

In parallel with the authentication process described above, the location provider 407 may activate the GPS chip 423. By doing this, the amount of time granted to the GPS hardware to obtain a location is maximized, and thus the Time to First Fix (TTFF) as seen by the location-authorized entity (for example a VPC) is reduced. The location provider 407 will withhold any position it obtains until such time as the native NG911 authenticator 413 confirms the requestor with a successful completion of the session certificate validation process. The location provider 407 will discard all obtained locations and, optionally, turn off the GPS chip 423 if the authentication process fails.

If the authentication process succeeds and if the location provider 407 obtains location information from the GPS chip 423, the location information will be formatted appropriately, such as, for example, into a PIDF-LO object. However, any suitable location information format may be used in the various embodiments. The location information, such as a PIDF-LO object, is then encrypted by the native location encryptor 415 using the VPC's (or other authorized requestor's) public key. In some situations, the location data may be too large to be encrypted directly with a public key. In such situations, the public key is used to encrypt a random session key which is in turn utilized to encrypt location information. The encryption methods applied may be the methods defined for PIDF-LO, or other location objects. The encrypted location information may then be sent to the third party VoIP application 405, which would send it to the network.

For example, the encrypted location information may be sent from the VoIP end point 315 to the LIS 317 via message M3, and then from the LIS 317 to the VPC 313 in message M4, as shown in FIG. 3. Because the location information is signed with the VPC 313 public key, only the VPC 313 can decrypt it because only the VPC 313 has its own private key. If the third party VoIP application 405 turns out to be unscrupulous, or defective, and sends the encrypted location information to another unauthorized party, the unauthorized party will not be able to decrypt the location information and, therefore, the user's location privacy will be maintained. After the location information is successfully decrypted by the VPC 313, the location information is sent by the VPC 313 to the ALI 133, where the PSAP 131 operator can access it and associate it with the corresponding 911 call in progress, as is now the practice for Phase 2 911. All of the above described operations will occur independently of the user's Location Privacy Settings, that is, the user privacy setting 401, provided that the location requester is successfully authenticated. In other words, the user privacy setting 401 will be overridden with respect to location information for purposes of an authentic emergency call.

As shown in FIG. 4, the User's Location Privacy settings, user privacy setting 401, is used as input to the location provider 407. If a location information request originates from a third party non-emergency application 403, the location information request would be denied if the user privacy setting 401 has GPS disabled; otherwise GPS access would be granted. In other words, the various embodiments maintain the "baseline" operation of existing devices such as those having the software architecture 200 of FIG. 2. As was discussed above with respect to FIG. 2, the location provider 205 would refuse to provide location information if the user had turned off GPS capability or restricted location sharing in the user privacy setting 201. The baseline API 409 therefore handles location information requests from one or more third party non-emergency applications 403 and interfaces with the GPS chip 423 via a hardware abstraction layer 421 to obtain location information when allowed by the user privacy setting 401. The software architecture 400 also includes a trusted native or embedded 911 dialer 417 and may include an emergency capable location provider 419 which is for trusted uses only.

An example VoIP end point 315, which is one example apparatus in accordance with the embodiments, is illustrated in FIG. 5. The VoIP end point 315 may be a mobile device and may operate using any suitable wireless interface. That is, transceiver 529 may use any suitable wireless interface such as, but not limited to, UMTS, WiFi, LTE, WiMAX, etc.

The VoIP end point 315 includes a software stack 500 in accordance with the embodiments. The terminology "software stack" as used herein refers generally to the ISO standard Open Systems Interconnection (OSI) Reference Model which is readily understood by one of ordinary skill. That is, the software stack 500 includes various software components that may operate at various layers of the OSI Reference Model. Such software components may be written as executable instructions for execution by one or more processors, and such executable instructions may be written using any suitable programming language. Only those components of the software stack 500 that are necessary to facilitate understanding of the embodiments by one of ordinary skill are shown and, therefore, it is to be understood that other software components may be present that are not shown in FIG. 4 or FIG. 5.

Also, although the software stack 500 is shown having various components, the embodiments are not so limited, and one or more of the various components may be implemented in other ways, such as ASICs, DSPs, hardwired circuitry (logic circuitry), or combinations thereof In other words, some embodiments may implement some of the software stack 500 components as hardwired circuitry that communicates with the remaining components of the software stack 500. For example, the native location encryptor 515 may be a hardware implementation that communicates with other components of software stack 500 over the internal communication bus 537 to the at least one processor 525. Other possible embodiments may occur to one of ordinary skill in view of the above disclosed information.

Furthermore, the block diagram of FIG. 5 is limited to showing only those circuits, devices and/or components, whether implemented as hardware or software, that are necessary to describe the features and advantages of the various embodiments and to facilitate teaching how to make and use the various embodiments to those of ordinary skill. It is to be understood that various other components, circuitry, and devices may be necessary in order to implement a complete functional apparatus (such as a mobile device) and that those various other components, circuitry, devices, etc., are understood to be present by those of ordinary skill.

In FIG. 5 the software stack 500 is shown executing on at least one processor 525 in accordance with an embodiment. The software stack 500 may include a third party non-emergency application 503 and at least one third party VoIP application 505 that is capable of initiating an emergency call, and/or emergency Short-Message-Service (SMS) or emergency Multi-Media-Message-Service (MMS) message. A "third party" application as used herein is an application that is obtained from a party other than the manufacturer of the VoIP end point 315. For example, some third party applications may be downloaded from the Internet or some other network. In another example, a third party application may be installed from a readable memory such as a flash drive, SD card, etc. The third party non-emergency application 503 may, from time-to-time, request location information from the GPS hardware 523, which is operatively coupled to the at least one processor 525 via an internal communication bus 537. The internal communication bus 537, which may be any appropriate interface, is shown connected directly to the various components of VoIP end point 315 however it is to be understood that various other hardware and components may exist and may be intervening between the various illustrated components. That is, operatively coupled components may have various other hardware and components intervening there-between. As discussed above, FIG. 5 is a diagram provided as an example and is not to be construed as a complete schematic diagram of a particular implementation of a VoIP end point or a mobile device. FIG. 5 provides an example for the purpose of describing to those of ordinary skill how to make and use the various embodiments. Therefore FIG. 5 is limited to showing only those components necessary to describe the features and advantages of the various embodiments to those of ordinary skill. It is to be understood that various other components, circuitry, and devices may be necessary in order to implement a complete functional apparatus (such as a mobile device) and that those various other components, circuitry, devices, etc., are understood to be present by those of ordinary skill.

The VoIP end point 315 therefore includes at least one processor 525, which is operatively coupled via an internal communication bus 537, to memory 535, a display 531 and a user interface, "UI" 533. The at least one processor 525 is also operatively coupled to at least one transceiver 529 and to GPS hardware 523. The least one processor 525 is operative to execute and run the software stack 500, which may be stored in memory 535 as shown. The memory 535 may also store the user privacy setting 501, which is accessed by the location provider 507 prior to releasing location information to any third party non-emergency application 503, or third party VoIP application 505.

The location provider 507 is operative to receive location information requests from either the third party non-emergency application 503 by way of a baseline API 509, or from the third party VoIP application 505 by way of an NG911 API 511. The location provider 507 checks the user privacy setting 501 stored in memory 535 and, based on the user privacy setting 501, decides whether or not to provide the requested location information. The location provider 507 communicates with the hardware abstraction layer 521 to obtain GPS location information from the GPS hardware 523 over the internal communication bus 537. The software stack 500 also includes the native NG911 authenticator 513, which is operatively coupled to the NG911 API 511 of the location provider 507. A native location encryptor 515 is operatively coupled to the NG911 API 511 of the location provider 507, and to the hardware abstraction layer 521. A trusted native or embedded 911 dialer 517 is operatively coupled to the hardware abstraction layer 521 and is used to place emergency 911 calls. The software stack 500 may also include, in some embodiments, an emergency-capable location provider for trusted uses only 519 as shown, which is also operatively coupled to the hardware abstraction layer 521, and is operatively coupled to the trusted native or embedded 911 dialer 517. Other applications 527 may also be present in the software stack 500 that are operatively coupled to the hardware abstraction layer 521, but that do not make any requests for location information.

Also, one of the various embodiments may be a computer readable memory that may contain the software stack 500 as executable instructions, for execution by at least one processor, that when executed, cause the at least one processor to operate in accordance with the functionality herein described. The computer readable memory may be any suitable non-volatile, non-transitory, memory such as, but not limited to, programmable chips such as EEPROMS, flash memory (such as thumb drives, NAND, eMMC, etc.), compact discs (CDs) digital video disks (DVDs), etc., that may be used to load executable instructions or program code to other processing devices or electronic mobile devices such as those that may benefit from the features of the herein described embodiments. The executable instructions may include the location provider 507, native NG911 authenticator 513, and the native location encryptor 515, and/or any of the other software stack 500 components illustrated in FIG. 5.

In the embodiment illustrated in FIG. 5, the location provider 507 is also operative to send the message M3 and receive the message M2 as shown in FIG. 3. As discussed above, the message M2 may be transmitted to the VoIP end point 315 transceiver 529, which may operate in accordance with any suitable wireless interface such as, but not limited to, UMTS, WiFi, LTE, WiMAX, etc. Additionally, messages M1 and M2 may use a messaging protocol such as, but not limited to, Transport Layer Security (TLS), Tunneled TLS (TTLS), or any other suitable messaging protocol.

Figure 6:
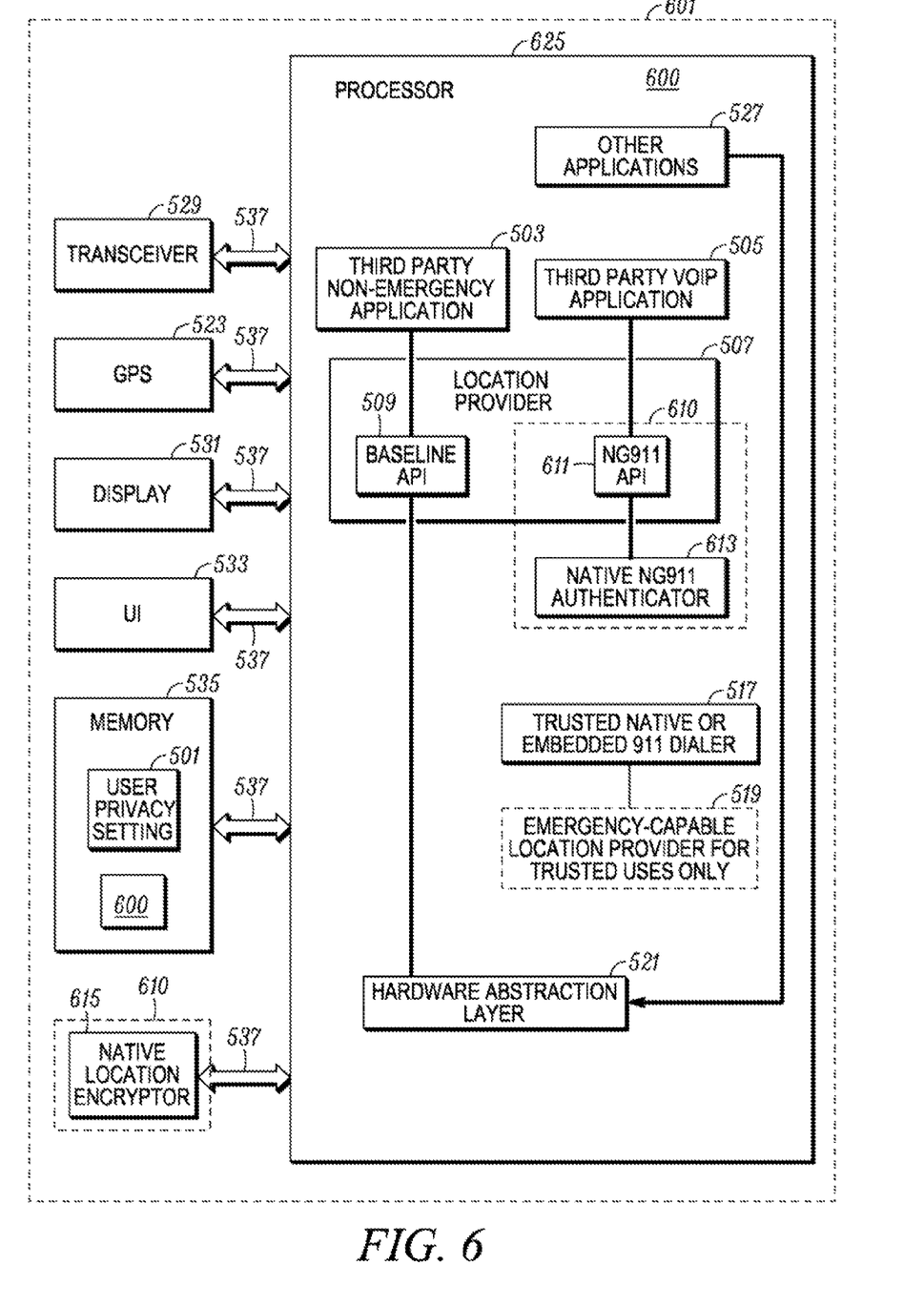
FIG. 6 is a block diagram of an example apparatus in accordance with an alternative embodiment to that shown in FIG. 5.

An alternative embodiment to that shown in FIG. 5 is illustrated in FIG. 6. The apparatus of FIG. 6 is a VoIP end point 601 which is a mobile device having components similar to those shown in FIG. 5. However, the emergency services location module 610 does not include the native location encryptor 615. The at least one processor 625 executes the software stack 600, which includes the emergency services location module 610, and the native location encryptor 615 communicates with the software stack 600 via the internal communication bus 537. The native location encryptor 615 is implemented as hardware, using for example, an ASIC. The emergency services location module 610 includes the NG911 API 611 and the native NG911 authenticator 613. The software stack 600 may be stored and executed from memory 535.

The term module as used herein refers to one or more components, that may be implemented as executable software instructions for execution on at least one processor, or as hardware using any suitable component such as, but not limited to, an Application Specific Integrated Circuit (ASIC) or some other suitable hardware, or combinations of both. For example the emergency services location module 510 illustrated in the example embodiment of FIG. 5 is shown implemented as executable instructions forming a portion of the software stack 500. The emergency services location module 610 illustrated in the example embodiment of FIG. 6 is shown implemented as a combination of executable instructions (i.e. the NG911 API 611 and the native NG911 authenticator 613) and hardware (i.e. the native location encryptor 615). Therefore, an emergency services location module in accordance with the embodiments, includes any software, firmware, hardware, or combinations thereof required to obtain the features and advantages described and disclosed herein.

Figure 7:
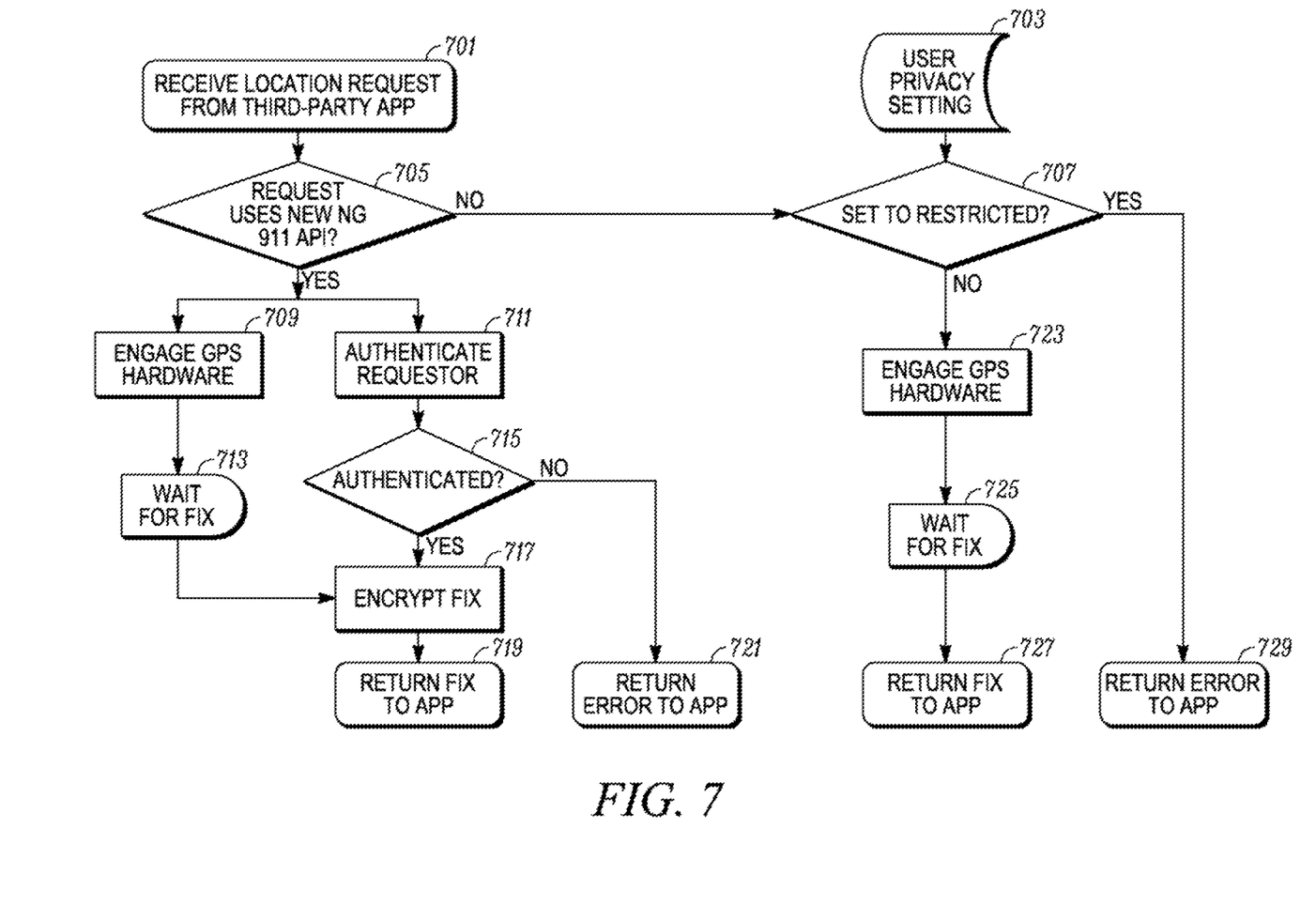
FIG. 7 is a flowchart providing details of operation of a mobile device having software architecture as shown in FIG. 4 and/or FIG. 5 or FIG. 6, in accordance with an embodiment.

The flowchart of FIG. 7 illustrates the operations of the VoIP endpoint mobile devices described above. In accordance with the embodiments, on the FIG. 7 flow path using the NG911 API 511, if a GPS fix fails, other location methods, such as WiFi location, would not be called upon even if the user's privacy settings enabled them. This is because these other methods, such as WiFi location, are not currently approved for E911 Phase 2 compliance. However, if this policy is changed, the embodiments may be modified accordingly to comply with such new provisions, as would be understood by one of ordinary skill.

Thus in block 701, the location provider 507 may receive a location information request from a third party application. The location provider 507 will check, in decision block 705, if the location information request has been received on the NG911 API 511. If not, then the location provider 507 will check the user privacy setting 703 to determine if location information is restricted as shown in decision block 707. If the location information request did originate on the NG911 API 511 in decision block 705, the location provider 507 will begin the parallel operation of engaging the GPS hardware 523 as shown in block 709, and beginning authentication of the requestor as shown in block 711. After engaging the GPS hardware in block 709, the location provider 507 must wait for a location fix as shown in block 713. During this waiting interval, the location provider 507 checks the session certificate in decision block 715 to determine if the requestor is legitimate. If yes, the location information may be encrypted by the native location encryptor 515 as shown in block 717 using a key appropriate for the authenticated requestor. The encrypted location information may then be returned to the requesting application as shown in block 719. If the requestor is not authenticated in decision block 715, no encryption is performed and an error message is returned to the requested application as shown in block 721.

Returning to decision block 707, which means that the request has originated via the baseline API 509, if the user privacy setting restricts location information provision, then an error message is returned to the requesting application as shown in block 729. However, is no restriction is set in the user privacy setting 703, then the location provider 507 engages the GPS hardware 523 as shown in block 723, waits for a location fix as shown in block 725, and returns the location information to the requesting application as shown in block 727.

In a first embodiment, the creation of a location object to be returned to the VPC 313 (such as PIDF-LO), and its encryption, would occur in the native location encryptor 515 shown in FIG. 5, or native location encryptor 415 shown in FIG. 4. In one alternative embodiment, the encryption of the location is performed by the GPS hardware 523, instead of the software native location encryptor 515. This alternative embodiment provides further protection for the location information against unauthorized snooping by rogue software installed on jailbroken mobile devices, e.g., those with Linux Root access obtained via unauthorized software hacks. In another alternative embodiment which was described briefly above, the native location encryptor 515 may be implemented as hardwired circuitry such as, but not limited to, an ASIC.

In some embodiments, a shared-secret session key is used for the encryption as is sometimes used in secure IP transactions. That is, once the VoIP end point, i.e. the mobile device, authenticates the VPC, the mobile device generates a session key made of a random number. This session key is encrypted with the VPC's public key then transmitted to the VPC. Only the VPC can read this session key because only the VPC can decrypt messages that the mobile device has signed with the VPC's public key. From that point on, all messaging between the mobile device (the native location encryptor) and the VPC is conducted via symmetrical encryption using this shared secret key.

Some embodiments will bind the encrypted location information to the specific third-party VoIP or messaging application from which the location information request arrived in the mobile device. This would prevent any other applications, including other VoIP applications, installed on the mobile device from receiving the encrypted location information when only one of them is currently involved in the active 911 call.

Further, some embodiments, bind the location request to an actual 911 call. For example, the messaging from the VPC may include a properly formatted Emergency Services Routing Key (ESRK) that links that VPC to an ongoing 911 call or NOVES event. This binding of the location request to the 911 call provides traceability for logging purposes, and an independent method of validating the location request.

In another alternative embodiment, the LIS 317 may authenticate the VPC 313. For example, the message M2 may contain a LIS session certificate instead of the VPC's certificate. Thus, the mobile device acting as VoIP end point 315, would authenticate the LIS 317 instead of the VPC 313, which is convenient because the LIS 317 is a part of the mobile device's home network.

Limiting Application Access to the NG911 Location. Due to the sensitive nature of engaging mobile device location technologies while a user has engaged a location privacy setting, the various embodiments may include additional limits for applications to activate the above described methods of operation. For example, in one embodiment, the NG911 API 511 may be separate and independent from the location provider 507. That is, further isolating the NG911 API 511 for the above procedures, rather than modifying any existing location APIs could help ensure that only applications explicitly written for VoIP and messaging with NG911 would have access to the encrypted positions. Therefore, in one alternative embodiment to that shown in FIG. 5, the NG911 API 511 is located outside of the location provider 507, but may still be a part of the software stack 500. In another alternative embodiment, the NG911 API 511 may be implemented on a separate high security processor or as hardwired circuitry such as, but not limited to, an ASIC, or may be combined onto a single ASIC along with the native location encryptor 515. In another alternative embodiment, the NG911 API 511 may be run on protected portions of microprocessors such as Arm TrustZone®, or Intel® Identity Protection Technology.

In another embodiment, a special application permission for NG911-capable location with override is required. That is, traditional location-based-services (LBS) applications with their existing permission parameters would not be allowed to access the APIs needed to carry out the above described procedures. Instead, only applications with a special dedicated "NG911 Location" permission would be allowed access to the APIs. Depending on the operating system, the permissions may block the installation of the application or the launching of the application. When the user installs an application that has nothing to do with NG911 calling and when that application turns out to be unscrupulous, the user may be alerted when the application requests "NG911 Location" permission.

In some embodiments, a separate application signing procedure for applications that will legitimately access the NG911 API is required. Depending on the operating system (OS), traditional applications may be signed with nothing more than a generic easily-obtained signature from the OS vendor. In the embodiments however, applications signed with only this method would be prevented from accessing the NG911 API. Instead, only a handful of trusted VoIP and messaging applications vetted as trustworthy will be signed by the OS vendor or mobile device manufacturer by a more-strictly controlled method in accordance with the embodiments.

Time-limiting the Certificate and Other Considerations. It may be desirable to prevent a VoIP application from accessing the NG911-capable encrypted location except for a limited time during an emergency call. Therefore, in some embodiments, the network specifies a time limit for the session certificate. The time limit may be specified within the messaging or may be embedded in the session certificate itself. For example, in this embodiment, the native location encryptor 515 and location provider 507 only provide encrypted location during the specified timeframe, after which the related GPS session would be terminated and the GPS hardware 523 put into a non-functional, lower power mode. After that time has expired, the VPC 313 would have to re-authenticate with the native NG911 authenticator 513. The time limit used for the certificate could be short, e.g., on the order of 1 minute. The VPC 313 tracks the time stamp at which the certificate is sent down to the mobile device where the certificate is validated in the NG911 Authenticator 413, and if a rebid comes after that shorter period expires, the VPC 313 would send another time-limited certificate valid for another time limit duration (such as one minute or a shorter duration as applicable).

Another option for setting the time limit is to select a duration longer than 99.9% of the 911 calls or sessions, e.g., 10 minutes. The GPS session would then run for 10 minutes, but encrypted fixes would only be passed to the VPC 313 when requested by the PSAP 131, e.g., via rebid or enablement of periodic location reporting. Yet another option is for the VPC 313 to send a session termination message to the NG911 Authenticator 413, via the mobile device, advising that the 911 session has ended. This would be in addition to, rather than in lieu of, the time-limited session certificate, to allow the 911 location session to be terminated early. The session termination message may invalidate or revoke the session certificate, or may trigger the NG911 Native Authenticator 413 to require a fresh authentication sequence.

It may also be desirable, in some embodiments, for a VPC to specify that only certain location technologies are acceptable, such as GPS only and not WiFi positioning. As different VPCs may have different requirements, this may not be appropriate to limit in the VoIP application nor in the location provider 507. Instead, messaging could be added between the VPC and the mobile device to allow the VPC to specify which location technologies are acceptable. Then the location provider 507 would be sure to only use those technologies.

It is to be understood that, in the various embodiments, it is not critical for the VPC or LIS to authenticate the mobile device. The mobile device may not have its own private/public key pair, so bidirectional asymmetric cryptography may not be possible. However, it is still desirable for the VPC to know with some confidence about the identity of the caller. As such, in some embodiments, the mobile device will include, and encrypt, its identifying numbers in the location response. The numbers might include the mobile device serial number, phone number, and possibly some identification of the third-party application. Because the native location encryptor 515 would provide this information and encrypt it, it is fairly secure and is only readable by the VPC. This identification could be used by the authorities to investigate and prosecute crank 911 calls.

Figure 8:
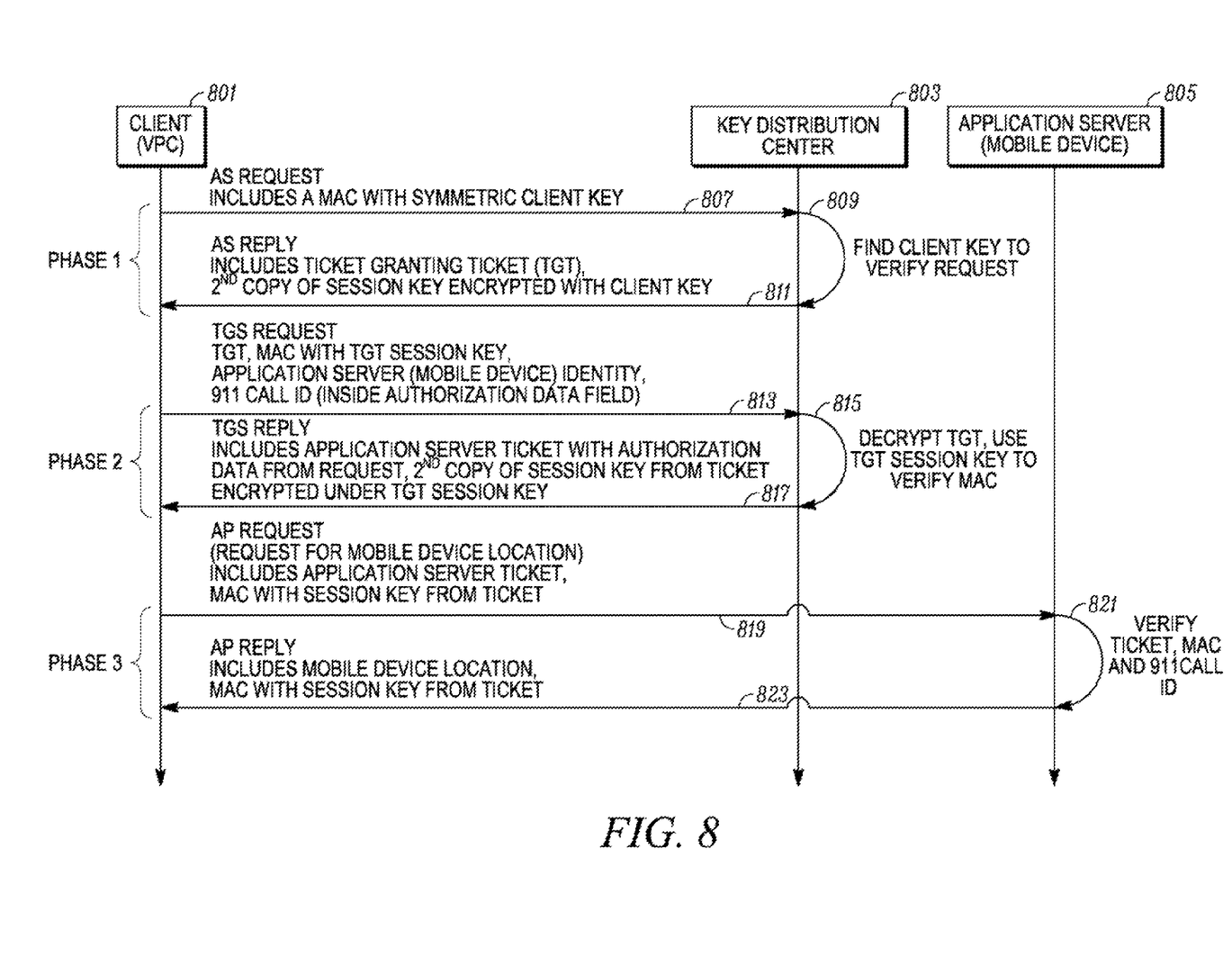
FIG. 8 is a message flow diagram that provides an example of using session certificates to secure location information requests.

Session Certificates. FIG. 8 is a message flow diagram that provides one example of how session certificates may operate in the various embodiments. The procedure of FIG. 8 may be implemented in accordance with a standard for implementing time-limited Session Certificates, for example "Kerberos," which is defined in IETF RFC 4120. In other words, a Kerberos ticket could be used as the above described Session Certificate.

A Kerberos ticket may contain the following information: identity of the client (owner of the ticket), identity of the service (service or application for which authorization is provided), ticket validity period, session key, and authorization data. For the identity of the client, which is the owner of the ticket, this would be the entity receiving location information from the mobile device such as the client (VPC) 801. For the identity of the service (service or application for which authorization is provided), this would correspond to the identifier for a particular mobile device which is providing the location information. That is, the identity would include some form of mobile device identifier. For example, the mobile device phone number, Network Address Identifier (NAI), MAC Address, or the IMEI could be used as the identity. The ticket validity period is defined as a period within which this ticket is valid. As discussed above, this could be on the order of a minute or shorter.

For the session key, a symmetric session key is used to establish end-to-end secure communications between the two parties, that is, between the VPC and mobile device. For example an AES (Advanced Encryption Standard) key or 3DES (Triple Data Encryption Standard) key may be used. The authorization data may be implemented by using some additional flags specifying security policy or restrictions. In one example, authorization data may include information about the 911 call. This information may be a call identifier such as an Emergency Services Routing Key (ESRK) or an Emergency Services Query Key (ESQK). The authorization data assures that the authorization to provide geographic location information is limited to only the one emergency call and cannot be obtained for any other purpose.

The ticket is encrypted using a Service Key which belongs to that service. A Service Key is a symmetric key as well, for example AES or 3DES, and is associated with a mobile device. Kerberos tickets are issued by a network infrastructure element called the KDC (Key Distribution Center) 803. The protocol for issuing Kerberos tickets having the information required in accordance with the embodiments is illustrated by the details provided in FIG. 8. In Phase 1, the client obtains a TGT (Ticket Granting Ticket) from the KDC (Key Distribution Center) 803. This is a client registration (and re-registration) phase. If a client (i.e. the VPC) 801 is no longer authorized to obtain location information for some reason, the KDC 803 will deny it a TGT. TGT includes a symmetric session key which may be used for authentication in the next phase. The client VPC 801 sends an authentication server (AS) request 807 to the KDC 803, including a MAC (Message Authentication Code) computed with a symmetric client key in message. The KDC 803 verifies the request per the client key as shown in 809, and sends AS reply 811 including a TGT and a second copy of the session key encrypted with the client VPC 801 key.

In Phase 2 of the procedure, the client obtains a ticket for a specific application server which in this case is a mobile device 805 which is making a 911 emergency call. The client VPC 801 provides a specific 911 call ID in the request so that it will get included in the ticket and will make the ticket specific to that call. The ticket received by the client VPC 801 will be limited in time as well as bound to a specific emergency call. The client VPC 801 sends TGS request 813 to the KDC 803 including the TGT, MAC computed with TGT session key, application server (i.e. mobile device) identity, and 911 call ID. The KDC 803 decrypts the TGT and uses the TGT session key to verify the MAC as shown in 815. The KDC 803 then sends a TGS reply 817 to the client VPC 801, including the application server (mobile device) ticket with authorization data from the request, and a second copy of the session key from the ticket encrypted under the TGT session key.

In Phase 3 of the procedure, the client makes use of the ticket (also referred to herein as a "session certificate") to obtain mobile device location data. The client VPC 801 sends a client to application server request (AP request) 819 to the application server which in this case is the mobile device 805. The mobile device 805 verifies the ticket, then decrypts it and uses the session key to verify the MAC (for message authentication). The mobile device 805 also verifies the following fields in the ticket (i.e. session certificate): client ID (identity of the VPC requesting location data), service ID (identity of the mobile device), emergency call ID (ESRK or ESQK) and validity period of the ticket (i.e. the mobile device confirms that the ticket is not an old/stale ticket) as shown in 821. If all verification steps of the ticket and request message pass, then the mobile device 805 sends an AP reply 823 to the client VPC 801 including the mobile device 805 location information, and MAC computed with the session key from the ticket.

Therefore the procedure described above and illustrated in FIG. 8 makes use of the Kerberos protocol but applies it for emergency services and requires that the specific authorization data includes call identifier information.

Creation of Per-Device Service Keys. The above described application of the Kerberos protocol for emergency services assumes that the KDC 803 will have access to a database of per-mobile device symmetric service keys which are needed to encrypt tickets.

It is possible that such per-device symmetric keys are not initially available but that each mobile device possesses a unique digital certificate and private key. Per mobile device certificates and private keys could be installed into each mobile device at manufacture time or possibly obtained later from an on-line Certificate Authority. Some examples of how unique per-mobile device service keys may be generated and placed into the KDC database are provided as follows.

In a first example, a mobile device establishes an SSL (or TLS) session with the KDC with 2-way authentication using both device and KDC certificates. Once an SSL/TLS session is established, then the mobile device could generate its own service key and securely transmit it to the KDC, protected with an SSL session. In one alternative, the KDC could generate a per-mobile device service key and securely transmit it to the device over an SSL session. In a second alternative, both the mobile device and KDC could generate some keying material which is exchanged over an SSL session. Then both sides (KDC and mobile device) will combine keying material from both sources and derive a service key. In a third alternative, both the mobile device and KDC derive a service key from one of the SSL/TLS keys (e.g., from the master secret). This approach would work just as well with any other PKI-based protocol utilized to establish a secure connection between KDC and the client. For example, IKE/IPSec or IKEv2/IPSec can be used instead.

In a second example, a mobile device may send a Kerberos AS Request to the KDC to obtain a TGT and gets back an AS Reply with a TGT and a TGT Session Key. The AS Request in this case is signed using a device private key and includes a device digital certificate. The corresponding TGT session key is then saved on the KDC and on the client as the Service Key for this mobile device.

In a third example, there is a service (application server) called "Service Key Generator" which has access to the KDC database. The Server Key Generator could be co-hosted with the KDC in some embodiments. For this example, each mobile device obtains an application server ticket for the Service Key Generator. A mobile device would then send an AP Request to the Service Key Generator. The Service Key Generator would: i) generate a new Service Key for this mobile device; ii) save the Service Key into the KDC database, and iii) encrypt the Service Key using a Kerberos AP Reply message and send it back to the mobile device.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An apparatus comprising:
    an emergency services location module, operatively coupled to location determination hardware, the emergency services location module operative to:
        receive a session certificate from an emergency services network entity in response to the apparatus placing an emergency services call or sending an emergency services message;
        validate the session certificate to validate that the emergency services network entity is authorized to receive location information; and
        send location information obtained from the location determination hardware, to the emergency services network entity, in response to validating the session certificate.

2. The apparatus of claim 1, where the emergency services location module is operative to:
    override a user privacy setting that prevents location information from being determined, in response to determining that the session certificate is valid.

3. The apparatus of claim 1, where the emergency services location module is operative to:
    encrypt the location information prior to sending the location information to the emergency services network entity.

4. The apparatus of claim 3, where the emergency services location module comprises:
    an emergency services application programming interface (API); and
    an authenticator, operatively coupled to the emergency services API, the authenticator operative to validate the session certificate; and
    a location encryptor operatively coupled to the location determination hardware and to the emergency services API, the location encryptor operative to encrypt the location information obtained from the location determination hardware prior to sending the location information to the emergency services network entity.

5. The apparatus of claim 4, comprising:
    at least one of a voice-over-Internet-protocol (VoIP) application, operative to place the emergency services call, or a text messaging application, operative to send an emergency-related text message to the emergency services network entity.

6. The apparatus of claim 1, where the emergency services location module comprises:

an emergency services application programming interface (API); and an authenticator, operatively coupled to the emergency services API, the authenticator operative to validate the session certificate.

7. The apparatus of claim 1, comprising:

a software stack, where at least a portion of the emergency services location module is contained in the software stack.

8. The apparatus of claim 7, comprising:

at least one processor, operatively coupled to the location determination hardware, the at least one processor operative to execute the software stack.

9. A method comprising:

receiving, by a mobile device, a session certificate from an emergency services network entity;

validating the session certificate to validate that the emergency services network entity is authorized to receive location information; and sending location information to the emergency services network entity, in response to validating the session certificate.

10. The method of claim 9, comprising:

overriding a user privacy setting of the mobile device that prevents location information from being determined, in response to determining that the session certificate is valid.

11. The method of claim 9, comprising:

encrypting the location information prior to sending the location information to the emergency services network entity.

12. The method of claim 11, comprising:

initiating location determination hardware to obtain the location information in parallel with the procedure of validating the session certificate.

13. The method of claim 9 comprising:

receiving the session certificate in a location information request received from the emergency services network entity.

14. The method of claim 13, where receiving the session certificate in a location information request received from the emergency services network entity, comprises:

receiving the emergency services network entity public key and where the session certificate is signed by a trusted authority's private key.

15. A method of operating an emergency services network entity, the method comprising:

sending a location information request message from the network entity to a mobile device, the location information request message including a session certificate and being in response to an emergency services message from the mobile device; and receiving location information from the mobile device in response to the location information request message.

16. The method of claim 15, comprising:

decrypting the location information; and sending the decrypted location information to a public safety answering point (PSAP).

17. The method of claim 16, where receiving location information from the mobile device in response to the location information request message comprises:

receiving the location information in a location object format.

18. The method of claim 17, where receiving the location information in a location object format comprises:

receiving the location information in a presence information data format location object ("PIDF-LO").

19. A method of operating an emergency services network, comprising:

sending a first message from a VoIP Positioning Center (VPC) to a location information server (LIS) including a VPC session certificate;

sending a second message from the LIS to a VoIP application of a mobile device over a wireless interface;

receiving a third message by the LIS from the mobile device, the third message including location information; and receiving a fourth message by the VPC from the LIS including the location information.

20. The method of claim 19, comprising:

decrypting the location information by the VPC; and sending the decrypted location information from the VPC to a public safety answering point (PSAP).

* * * * *